(12) United States Patent
McIntyre et al.

(10) Patent No.: US 10,260,720 B2
(45) Date of Patent: Apr. 16, 2019

(54) AREA LIGHT

(71) Applicant: Milwaukee Electric Tool Corporation, Brookfield, WI (US)

(72) Inventors: Ross McIntyre, Wauwatosa, WI (US); Kyle Harvey, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 167 days.

(21) Appl. No.: 15/200,037

(22) Filed: Jul. 1, 2016

(65) Prior Publication Data

US 2017/0003009 A1 Jan. 5, 2017

Related U.S. Application Data

(60) Provisional application No. 62/299,757, filed on Feb. 25, 2016, provisional application No. 62/187,539, filed on Jul. 1, 2015.

(51) Int. Cl.
| | |
|---|---|
| *F21L 4/02* | (2006.01) |
| *F21S 9/02* | (2006.01) |
| *F21V 5/04* | (2006.01) |
| *F21L 14/02* | (2006.01) |
| *F21V 21/40* | (2006.01) |
| *F21V 23/00* | (2015.01) |

(Continued)

(52) U.S. Cl.
CPC .............. *F21V 23/003* (2013.01); *F21S 9/02* (2013.01); *F21V 5/04* (2013.01); *F21V 21/406* (2013.01); *H05B 33/0803* (2013.01); *H05B 33/0842* (2013.01); *H05B 37/02* (2013.01); *F21L 4/02* (2013.01); *F21L 14/02* (2013.01); *F21V 23/04* (2013.01); *F21V 29/74* (2015.01); *F21W 2131/1005* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 3,331,958 | A | 7/1967 | Adler |
| 4,032,771 | A | 6/1977 | Ilzig |

(Continued)

FOREIGN PATENT DOCUMENTS

| | | |
|---|---|---|
| EP | 0193756 | 9/1986 |
| EP | 1205428 | 5/2002 |

(Continued)

OTHER PUBLICATIONS

International Search Report and Written Opinion for Application No. PCT/US2017/018412 dated May 23, 2017 (13 pages).

*Primary Examiner* — Britt D Hanley
(74) *Attorney, Agent, or Firm* — Michael Best & Friedrich LLP

(57) ABSTRACT

An area light includes a housing defining a central axis and including a first portion and a second portion, the second portion arranged to emit light. A lens is coupled to the housing, and a light assembly is disposed within the second portion. The light assembly includes a plurality of LEDs arranged to emit light through the lens and in a direction that extends 360 degrees around the central axis. A battery is selectively coupled to the housing and is arranged to provide power to the LEDs to allow for the emission of light at a level of at least 5700 lumens for at least two hours.

20 Claims, 8 Drawing Sheets

(51) Int. Cl.
  *F21V 23/04* (2006.01)
  *F21V 29/74* (2015.01)
  *H05B 33/08* (2006.01)
  *H05B 37/02* (2006.01)
  *F21W 131/10* (2006.01)
  *F21Y 115/10* (2016.01)

(56) References Cited

U.S. PATENT DOCUMENTS

| | | |
|---|---|---|
| 4,228,489 A | 10/1980 | Martin |
| 4,268,894 A | 5/1981 | Bartunek et al. |
| 4,324,477 A | 4/1982 | Miyazaki |
| 5,203,621 A | 4/1993 | Weinmeister et al. |
| 5,207,747 A | 5/1993 | Gordin et al. |
| 5,351,172 A | 9/1994 | Attree et al. |
| 5,400,234 A | 3/1995 | Yu |
| 5,428,520 A | 6/1995 | Skief |
| 5,630,660 A | 5/1997 | Chen |
| 5,934,628 A | 8/1999 | Bosnakovic |
| 5,964,524 A | 10/1999 | Qian |
| 6,045,240 A | 4/2000 | Hochstein |
| D428,176 S | 7/2000 | Bamber et al. |
| 6,092,911 A | 7/2000 | Baker, III et al. |
| 6,099,142 A | 8/2000 | Liu |
| 6,149,283 A | 11/2000 | Conway et al. |
| 6,183,114 B1 | 2/2001 | Cook et al. |
| 6,213,626 B1 | 4/2001 | Qian |
| 6,255,786 B1 | 7/2001 | Yen |
| 6,265,969 B1 | 7/2001 | Shih |
| D452,022 S | 12/2001 | Osiecki et al. |
| 6,367,949 B1 | 4/2002 | Pederson |
| 6,379,023 B1 | 4/2002 | Passno |
| 6,461,017 B2 | 10/2002 | Selkee |
| 6,474,844 B1 | 11/2002 | Ching |
| 6,554,459 B2 | 4/2003 | Yu et al. |
| 6,637,904 B2 | 10/2003 | Hernandez |
| 6,824,297 B1 | 11/2004 | Lee |
| 6,854,862 B1 | 2/2005 | Hoof |
| 6,857,756 B2 | 2/2005 | Reiff et al. |
| 6,873,249 B2 | 3/2005 | Chu |
| 6,877,881 B2 | 4/2005 | Tsao |
| 6,899,441 B2 | 5/2005 | Chen |
| D506,847 S | 6/2005 | Hussaini et al. |
| 6,902,294 B2 | 6/2005 | Wright |
| 6,926,428 B1 | 8/2005 | Lee |
| 7,001,044 B2 | 2/2006 | Leen |
| 7,001,047 B2 | 2/2006 | Holder et al. |
| 7,011,280 B2 | 3/2006 | Murray et al. |
| 7,063,444 B2 | 6/2006 | Lee et al. |
| 7,073,926 B1 | 7/2006 | Kremers et al. |
| D532,536 S | 11/2006 | Krieger et al. |
| 7,152,997 B1 | 12/2006 | Kovacik et al. |
| 7,153,004 B2 | 12/2006 | Galli |
| 7,194,358 B2 | 3/2007 | Callaghan et al. |
| 7,195,377 B2 | 3/2007 | Tsai |
| 7,224,271 B2 | 5/2007 | Wang |
| D553,281 S | 10/2007 | Rugendyke et al. |
| D553,771 S | 10/2007 | Watson et al. |
| 7,278,761 B2 | 10/2007 | Kuan |
| 7,350,940 B2 | 4/2008 | Haugaard et al. |
| 7,364,320 B2 | 4/2008 | Van Deursen et al. |
| 7,367,695 B2 | 5/2008 | Shiau |
| 7,470,036 B2 | 12/2008 | Deighton et al. |
| 7,484,858 B2 | 2/2009 | Deighton et al. |
| 7,503,530 B1 | 3/2009 | Brown |
| 7,566,151 B2 | 7/2009 | Whelan et al. |
| 7,618,154 B2 | 11/2009 | Rosiello |
| 7,638,970 B1 | 12/2009 | Gebhard et al. |
| D612,965 S | 3/2010 | Extrand |
| 7,670,034 B2 | 3/2010 | Zhang et al. |
| D621,536 S | 8/2010 | Lee |
| D622,430 S | 8/2010 | Chilton |
| 7,798,684 B2 | 9/2010 | Boissevain |
| 7,828,465 B2 | 11/2010 | Roberge et al. |
| 7,857,486 B2 | 12/2010 | Long et al. |
| 7,914,178 B2 | 3/2011 | Xiang et al. |
| 7,914,182 B2 | 3/2011 | Mrakovich et al. |
| 7,972,036 B1 | 7/2011 | Schach et al. |
| D643,138 S | 8/2011 | Kawase et al. |
| 7,988,335 B2 | 8/2011 | Liu et al. |
| 7,990,062 B2 | 8/2011 | Liu |
| 7,997,753 B2 | 8/2011 | Walesa et al. |
| 8,007,128 B2 | 8/2011 | Wu et al. |
| 8,007,145 B2 | 8/2011 | Leen |
| 8,029,169 B2 | 10/2011 | Liu |
| 8,047,481 B2 | 11/2011 | Shen |
| 8,087,797 B2 | 1/2012 | Pelletier et al. |
| 8,142,045 B2 | 3/2012 | Peak |
| 8,167,466 B2 | 5/2012 | Liu |
| D661,417 S | 6/2012 | Kung |
| 8,201,979 B2 | 6/2012 | Deighton et al. |
| D665,521 S | 8/2012 | Werner et al. |
| 8,235,552 B1 | 8/2012 | Tsuge |
| 8,262,248 B2 | 9/2012 | Wessel |
| 8,294,340 B2 | 10/2012 | Yu et al. |
| 8,322,892 B2 | 12/2012 | Scordino et al. |
| 8,328,398 B2 | 12/2012 | Van Deursen |
| 8,330,337 B2 | 12/2012 | Yu et al. |
| 8,360,607 B2 | 1/2013 | Bretschneider et al. |
| 8,366,290 B2 | 2/2013 | Maglica |
| 8,403,522 B2 | 3/2013 | Chang |
| 8,425,091 B2 | 4/2013 | Chen |
| 8,439,531 B2 | 5/2013 | Trott et al. |
| 8,465,178 B2 | 6/2013 | Wilcox et al. |
| 8,485,691 B2 | 7/2013 | Hamel et al. |
| D687,591 S | 8/2013 | Chilton et al. |
| 8,547,022 B2 | 10/2013 | Summerford et al. |
| D694,445 S | 11/2013 | Shiu |
| D695,434 S | 12/2013 | Shen |
| 8,599,097 B2 | 12/2013 | Intravatola |
| D698,471 S | 1/2014 | Poon |
| D699,874 S | 2/2014 | Chilton et al. |
| 8,651,438 B2 | 2/2014 | Deighton et al. |
| 8,659,433 B2 | 2/2014 | Petrou |
| 8,692,444 B2 | 4/2014 | Patel et al. |
| 8,696,177 B1 | 4/2014 | Frost |
| D705,467 S | 5/2014 | Aglassinger |
| D706,968 S | 6/2014 | McDonough et al. |
| D708,376 S | 7/2014 | Crowe et al. |
| 8,801,226 B2 | 8/2014 | Moore |
| 8,851,699 B2 | 10/2014 | McMillan |
| 8,858,016 B2 | 10/2014 | Strelchuk |
| 8,858,026 B2 | 10/2014 | Lee et al. |
| 8,939,602 B2 | 1/2015 | Wessel |
| 8,979,331 B2 | 3/2015 | Lee et al. |
| D726,354 S | 4/2015 | Davies |
| D728,402 S | 5/2015 | Case |
| 9,068,736 B2 | 6/2015 | Lee et al. |
| D747,263 S | 1/2016 | Lafferty |
| 9,851,088 B2 * | 12/2017 | Harvey .................. F21V 29/83 |
| D822,246 S | 7/2018 | Hou |
| D828,939 S | 9/2018 | Bo |
| 2002/0136005 A1 | 9/2002 | Lee |
| 2002/0167814 A1 | 11/2002 | Ching |
| 2002/0191396 A1 * | 12/2002 | Reiff ..................... F21L 4/04 |
| | | 362/246 |
| 2003/0090904 A1 | 5/2003 | Ching |
| 2003/0137847 A1 | 7/2003 | Cooper |
| 2003/0174503 A1 | 9/2003 | Yueh |
| 2006/0007682 A1 | 1/2006 | Reiff, Jr. et al. |
| 2006/0067077 A1 | 3/2006 | Kumthampinij et al. |
| 2006/0146550 A1 | 7/2006 | Simpson et al. |
| 2006/0279948 A1 | 12/2006 | Tsai |
| 2006/0285323 A1 | 12/2006 | Fowler |
| 2007/0211470 A1 | 9/2007 | Huang |
| 2007/0297167 A1 | 12/2007 | Greenhoe |
| 2008/0112170 A1 | 5/2008 | Trott et al. |
| 2008/0158887 A1 | 7/2008 | Zhu et al. |
| 2008/0165537 A1 | 7/2008 | Shiau |
| 2008/0198588 A1 | 8/2008 | O'Hern |
| 2008/0253125 A1 | 10/2008 | Kang et al. |
| 2008/0302933 A1 | 12/2008 | Cardellini |
| 2009/0080205 A1 | 3/2009 | Chang et al. |
| 2009/0134191 A1 | 5/2009 | Phillips |

(56) References Cited

U.S. PATENT DOCUMENTS

| | | |
|---|---|---|
| 2009/0135594 A1 | 5/2009 | Yu et al. |
| 2009/0303717 A1 | 12/2009 | Long et al. |
| 2010/0027260 A1 | 2/2010 | Liu |
| 2010/0027269 A1 | 2/2010 | Lo et al. |
| 2010/0072897 A1 | 3/2010 | Zheng |
| 2010/0080005 A1 | 4/2010 | Gattari |
| 2010/0091495 A1 | 4/2010 | Patrick |
| 2010/0142213 A1 | 6/2010 | Bigge et al. |
| 2010/0315824 A1 | 12/2010 | Chen |
| 2010/0328951 A1 | 12/2010 | Boissevain |
| 2011/0031887 A1 | 2/2011 | Stoll et al. |
| 2011/0038144 A1 | 2/2011 | Chang |
| 2011/0050070 A1 | 3/2011 | Pickard |
| 2011/0058367 A1 | 3/2011 | Shiau et al. |
| 2011/0075404 A1 | 3/2011 | Allen et al. |
| 2011/0121727 A1 | 5/2011 | Sharrah et al. |
| 2011/0156584 A1 | 6/2011 | Kim |
| 2011/0228524 A1 | 9/2011 | Greer |
| 2011/0286216 A1 | 11/2011 | Araman |
| 2011/0317420 A1 | 12/2011 | Jeon et al. |
| 2012/0026729 A1 | 2/2012 | Sanchez et al. |
| 2012/0033400 A1 | 2/2012 | Remus et al. |
| 2012/0033429 A1 | 2/2012 | Van De Ven |
| 2012/0044707 A1 | 2/2012 | Breidenassel |
| 2012/0048511 A1 | 3/2012 | Moshtagh |
| 2012/0049717 A1 | 3/2012 | Lu |
| 2012/0057351 A1 | 3/2012 | Wilcox et al. |
| 2012/0087118 A1 | 4/2012 | Bailey et al. |
| 2012/0087125 A1 | 4/2012 | Liu |
| 2012/0098437 A1 | 4/2012 | Smed |
| 2012/0120674 A1 | 5/2012 | Jonker |
| 2012/0140455 A1 | 6/2012 | Chang |
| 2012/0155104 A1 | 6/2012 | Jonker |
| 2012/0212963 A1 | 8/2012 | Jigamian |
| 2012/0234519 A1 | 9/2012 | Lee |
| 2012/0236551 A1 | 9/2012 | Sharrah et al. |
| 2012/0247735 A1 | 10/2012 | Ito et al. |
| 2012/0262917 A1 | 10/2012 | Courcelle |
| 2012/0300487 A1 | 11/2012 | Jonker |
| 2013/0032323 A1 | 2/2013 | Hsu |
| 2013/0058078 A1 | 3/2013 | Meng |
| 2013/0077296 A1 | 3/2013 | Goeckel et al. |
| 2013/0128565 A1 | 5/2013 | Cugini et al. |
| 2013/0176713 A1 | 7/2013 | Deighton et al. |
| 2013/0187785 A1 | 7/2013 | McIntosh et al. |
| 2013/0258645 A1 | 10/2013 | Weber et al. |
| 2013/0265780 A1 | 10/2013 | Choski et al. |
| 2013/0322073 A1 | 12/2013 | Hamm et al. |
| 2014/0140050 A1 | 5/2014 | Wong et al. |
| 2014/0192543 A1 | 7/2014 | Deighton et al. |
| 2014/0218936 A1 | 8/2014 | Mahling et al. |
| 2014/0268775 A1 | 9/2014 | Kennemer et al. |
| 2014/0301066 A1 | 10/2014 | Inskeep |
| 2014/0307443 A1 | 10/2014 | Clifford et al. |
| 2014/0376216 A1 | 12/2014 | McLoughlin et al. |
| 2015/0023771 A1 | 1/2015 | Carr et al. |
| 2015/0233569 A1 | 8/2015 | Xue et al. |
| 2015/0233571 A1 | 8/2015 | Inan et al. |

FOREIGN PATENT DOCUMENTS

| | | |
|---|---|---|
| EP | 2436641 | 4/2012 |
| GB | 2424694 | 10/2006 |
| KR | 20100089371 A | 8/2010 |
| KR | 20100116933 | 11/2010 |
| WO | 2002044503 | 6/2002 |
| WO | WO-2011073828 A1 | 6/2011 |
| WO | WO-2011112005 A2 | 9/2011 |
| WO | 2014083117 | 6/2014 |
| WO | 2014207595 | 12/2014 |

* cited by examiner

AREA LIGHT

RELATED APPLICATION DATA

The present application claims priority to U.S. Provisional Application No. 62/299,757 filed Feb. 25, 2016 and U.S. Provisional Application No. 62/187,539 filed Jul. 1, 2015.

BACKGROUND

The present invention relates lighting devices, and more particularly to portable workspace lighting devices.

SUMMARY

The present invention provides, in one aspect, an area light including a power inlet connectable to a power source, a housing supporting a light assembly, and a user interface including control members configured to operate the light assembly between multiple modes of operation.

In accordance with some constructions, the power source is a battery, the light assembly is an array of LEDs, and the user interface includes a first control member for turning the light assembly on and off and a second control member for operating the light between two or more intensity levels.

In accordance with some constructions, the battery is a 5 amp/hour battery and is capable of providing power to the array of LEDs to produce between 5700 lumens and 7700 lumens for 1 to 3 hours. More specifically, the battery is configured to provide power to the array of LEDs to produce 6700 lumens for about 2 hours.

In accordance with some constructions, the light assembly is an array of 80 to 280 LEDs. More specifically, the light assembly is an array of 180 LEDs. This array of LEDs may be configured to emit light at approximately 3700-4300 Kelvin with a color rendering index (CRI) between about 50 and 100. More specifically, the light that is emitted by the LEDs is about 4000 Kelvin with a CRI of about 70.

In accordance with some constructions, the housing includes a lens surrounding the light assembly. The lens is configured to withstand a two meter drop test. The lens may be removably coupled to the housing. When the lens is coupled to the housing and surrounds the light assembly, approximately 3500-5500 lumens passes through the lens. More specifically, approximately 4500 lumens will pass through the lens.

In one construction, an area light includes a housing defining a central axis and including a first portion and a second portion, the second portion arranged to emit light. A lens is coupled to the housing, and a light assembly is disposed within the second portion. The light assembly includes a plurality of LEDs arranged to emit light through the lens and in a direction that extends 360 degrees around the central axis. A battery is selectively coupled to the housing and is arranged to provide power to the LEDs to allow for the emission of light at a level of at least 5700 lumens for at least two hours.

In another construction, an area light includes a housing defining a central axis and including a first portion and a second portion, a lens coupled to the housing and disposed substantially within the second portion, and a light assembly arranged to emit light from each of a plurality of sectors arranged around the central axis, the plurality of sectors cooperating to completely surround the central axis. A plurality of LEDs is arranged in each of the plurality of sectors, and a control unit is operable to control the distribution of electrical power to the plurality of LEDs, and to selectively direct power to all of the plurality of sectors or to a subset of the plurality of sectors.

In yet another construction, an area light includes a housing defining a central axis and a light assembly defining a plurality of sectors that extend 360 degrees around the central axis, each of the plurality of sectors including a plurality of LEDs arranged to emit light in a direction substantially normal to the central axis. A planar sector is arranged normal to the central axis and includes a plurality of top LEDs arranged to emit light in a direction substantially parallel to the central axis. A lens is coupled to the housing and covers the light assembly and the planar sector, a port is formed as part of the housing and sized to selectively receive a battery, and a power inlet is arranged to selectively receive electrical power from an AC source of power. A control unit is operable to control the distribution of electrical power from one of the port and the power inlet to the plurality of LEDs, and is operable to selectively direct power to all of the plurality of sectors or to a subset of the plurality of sectors.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-6 illustrate an area light 10 configured to provide illumination to a workspace. The area light 10 may be held by a user or hung on a support member using features discussed in greater detail below. In addition, the area light 10 may be controlled via a user interface 14 to operate in a plurality of lighting modes.

Figure 1:
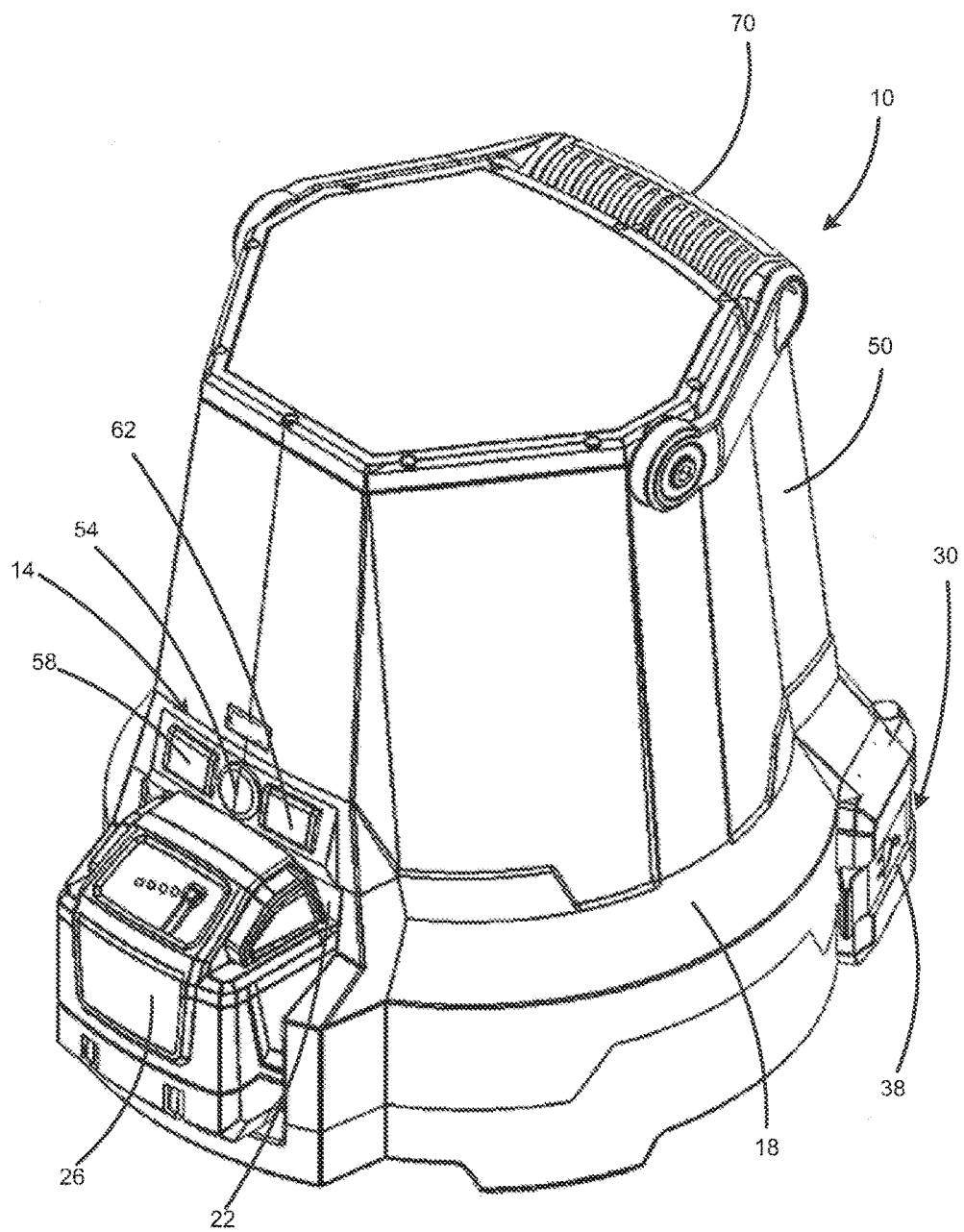
FIG. 1 is a front perspective view of an area light.
Figure 2:
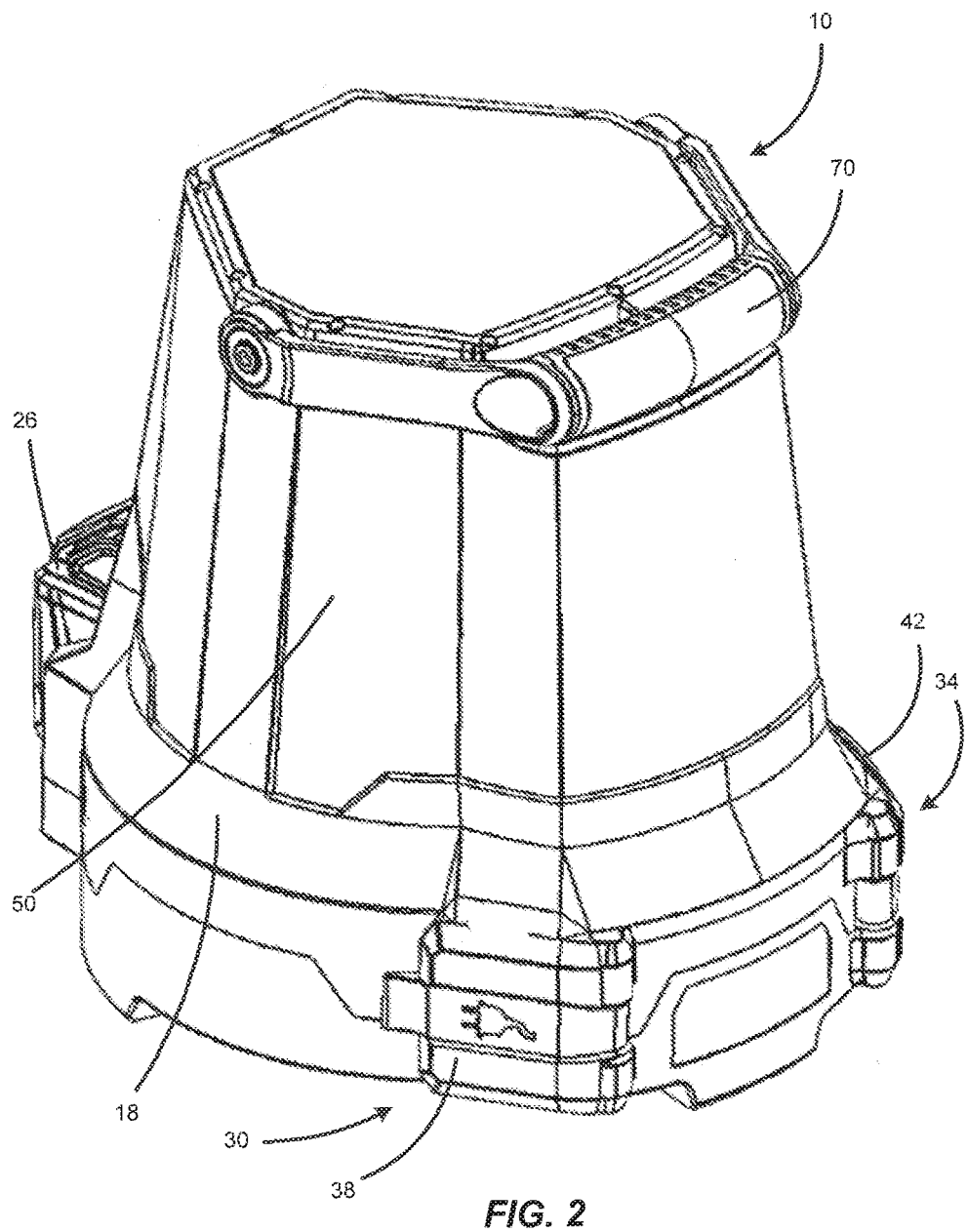
FIG. 2 is a first side, rear perspective view of the area light.
Figure 3:
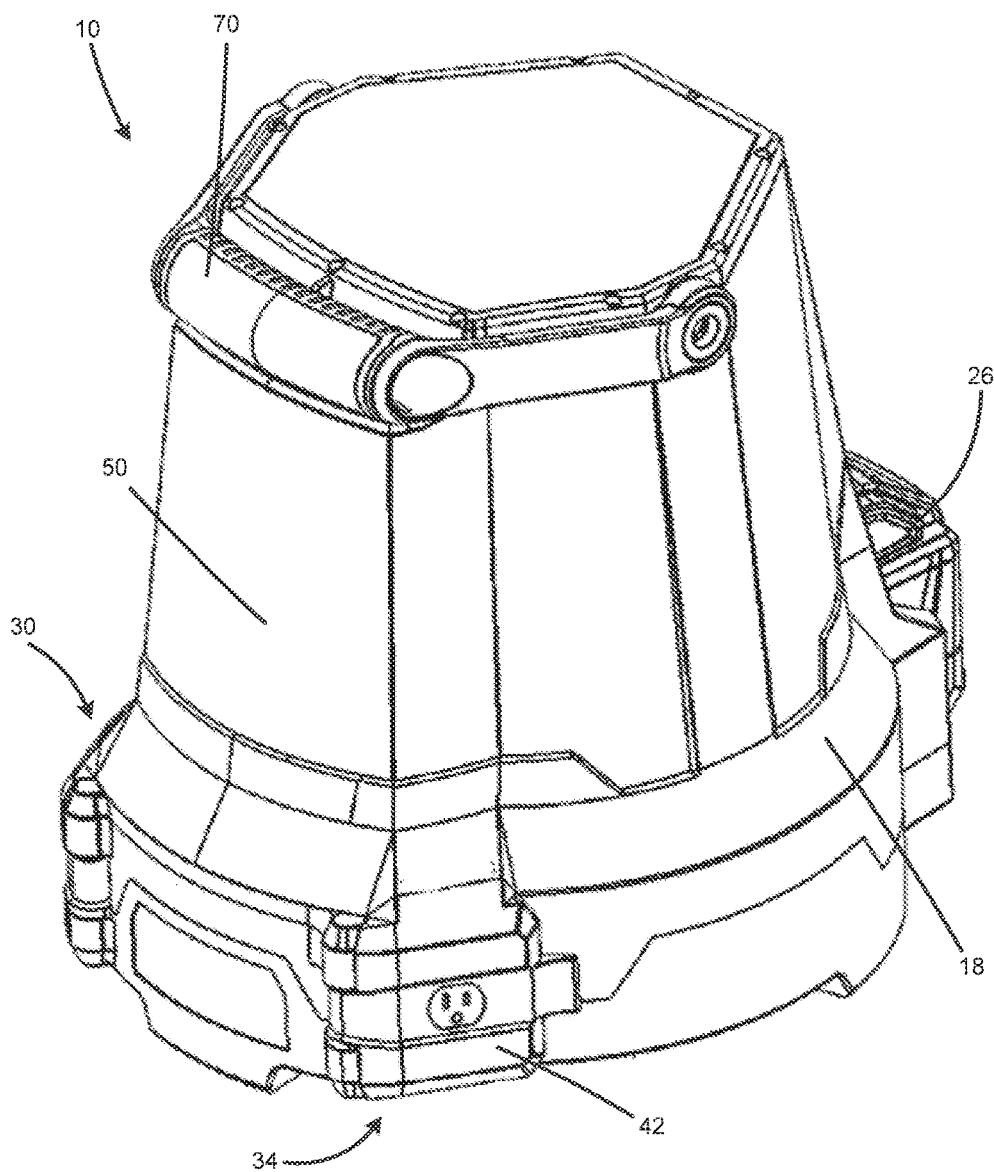
FIG. 3 is a second side, rear perspective view of the area light.

With reference to FIG. 1-3, the area light 10 includes a housing 18 with a port 22 configured to detachably support a battery 26 at one end. The housing 18 also includes a power inlet 30 (e.g., AC power inlet, etc.) and a power outlet 34 (e.g., standard three pin adapter, any standard outlet used in countries around the world, etc.) spaced from the port 22 and configured to, among other things, allow for multiple lights 10 to be connected to the same power source via connections with other lights 10. Put simply, multiple lights 10 may be 'daisy-chained' together. In the illustrated construction, the power inlet 30 and the power outlet 34 are selectively covered by pivoting doors 38, 42 such that the inlet 30 and the outlet 34 may be covered and protected when they are not in use.

The battery 26 and/or an external power source are configured to supply power to a light assembly 46 via the port 22 and the power inlet 30, respectively. In preferred constructions, the battery 26 is a power tool battery pack that can be inserted into the port 22 and removed from the port 22 without any disassembly of the light 10. In one construction, the light assembly 46 includes an array of LEDs. For example, the light assembly 46 may be an array of about 80-280 LEDs. More specifically, the light assembly 46 may be an array of 180 LEDs. In a specific example, the array of LEDs is configured to generate approximately 5700-7700 lumens for about two hours when powered by a 5 amp/hour battery. Further, the light that is emitted by the LEDs is approximately 3700-4300 Kelvin with a color rendering index (CRI) between about 50 and 100. More specifically, the light that is emitted is about 4000 Kelvin with a CRI of about 70.

With reference to FIGS. 1-4, the housing 18 is also configured to support a lens 50 that surrounds the light assembly 46. In some constructions, the lens 50 may be detachably coupled to the housing 18. For example, the lens 50 may be coupled to the housing 18 using a set of fasteners, a ball detent, an interference fit, or other suitable mechanisms.

In some constructions, the lens 50 is be configured to withstand a two meter drop test without any adverse functional effects. This may be accomplished by having a certain lens thickness or by constructing the lens 50 from various materials. In addition, the lens 50 is also configured to have specific light transmission properties—that is, the lens 50 may be configured to transmit a certain percentage, color, or other light characteristic from the light assembly 46 to the surrounding workspace. In a specific example, the lens 50 is configured to transmit approximately 3500-5500 lumens from the light assembly to the work space. More specifically, the lens 50 is configured to transmit 4500 lumens from the light assembly 46 to the work space. The lens also shifts the color temperature of the light by about 200 Kelvin such that the light exiting the lens has a color temperature between about 3500 Kelvin and 4100 Kelvin.

Figure 4:
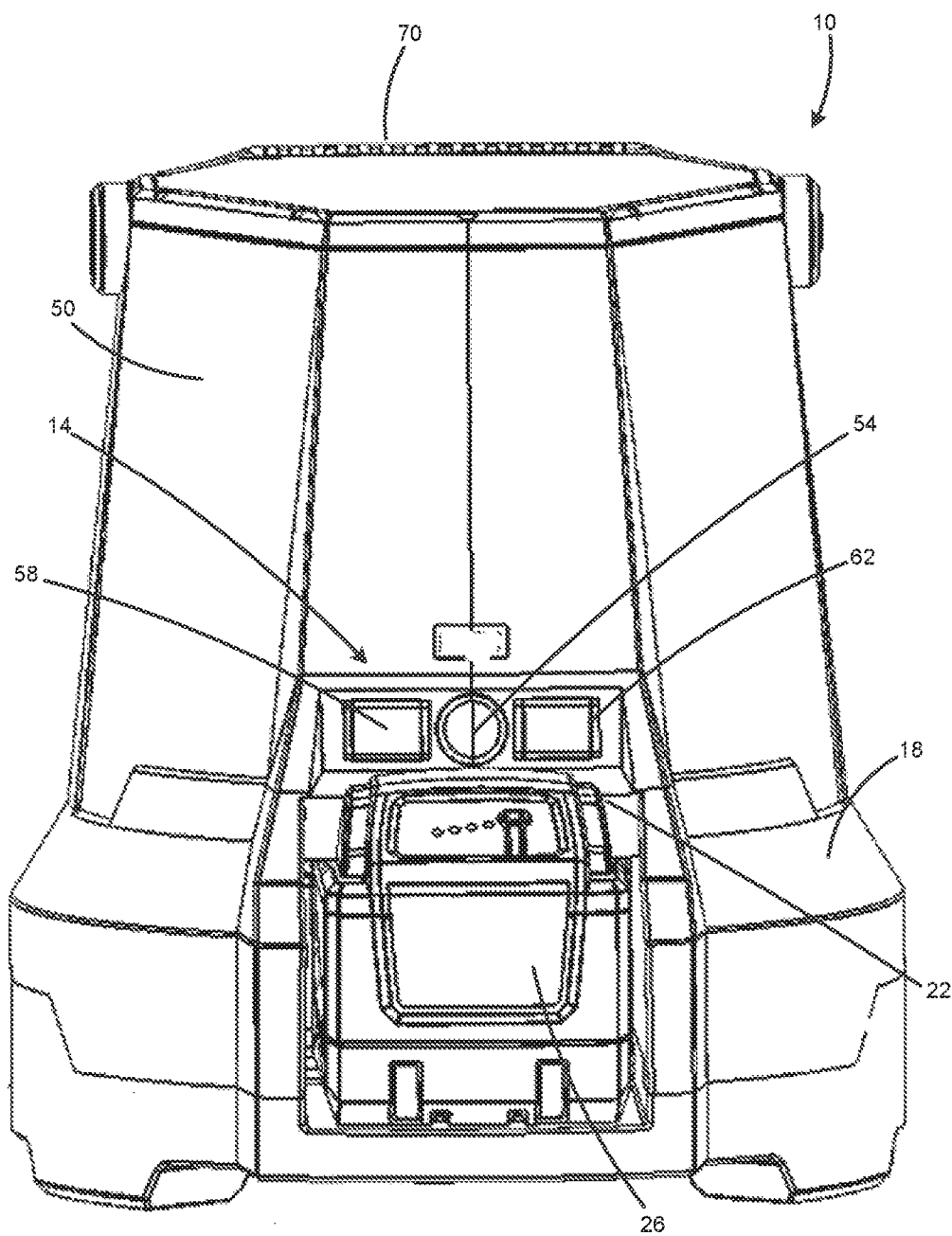
FIG. 4 is a front view of the area light.

With reference to FIGS. 1 and 4, the area light 10 includes the user interface 14 disposed on the housing 18. In the illustrated construction, the user interface 14 includes a first control member 54, a second control member 58, and a third control member 62. The first control member 54 may be a button, switch, or any suitable control mechanism that is configured to toggle the light assembly 46 between an energized state (i.e., on) and a de-energized state (i.e., off). The second control member 58 may also be a button, switch or any suitable control mechanism that is configured to toggle sections of the light assembly 46 on and off. Accordingly, the light assembly 46 may be operated such that only portions of the light assembly 46 are energized. For example, one half (divided along any axis) of the light assembly 46 may be energized while the other half is de-energized, and vice versa. The third control member 62 also may be a button, switch or any suitable control mechanism that is configured to control the intensity of light emitted by the light assembly 46. For example, the third control member 62 may operate the light between a high intensity, medium intensity, and low intensity. Other intermediate intensities may be included as well. In the specific example of the LED light assembly described above, the light intensity control is accomplished using pulse width modulation, although other alternative methods known in the art may be used. While three separate control members are illustrated and described, other constructions may combine some of the functions described into fewer than three control members or may include additional control members that allow for different operating functions.

The area light 10 also includes an internal control unit 66, such as a microcontroller or memory unit storing information and executable functions. The internal control unit 66 is configured to store the state of the light as set by the second and third control members 58, 62 when the light assembly 46 is powered on and off by the first control member 54. This results in a light 10 that may be turned on and off while maintaining the most recent state of the light (e.g., the section of the light turned on and the intensity level), thereby allowing the user to turn the light on with the last settings without having to adjust the light.

Figure 5:
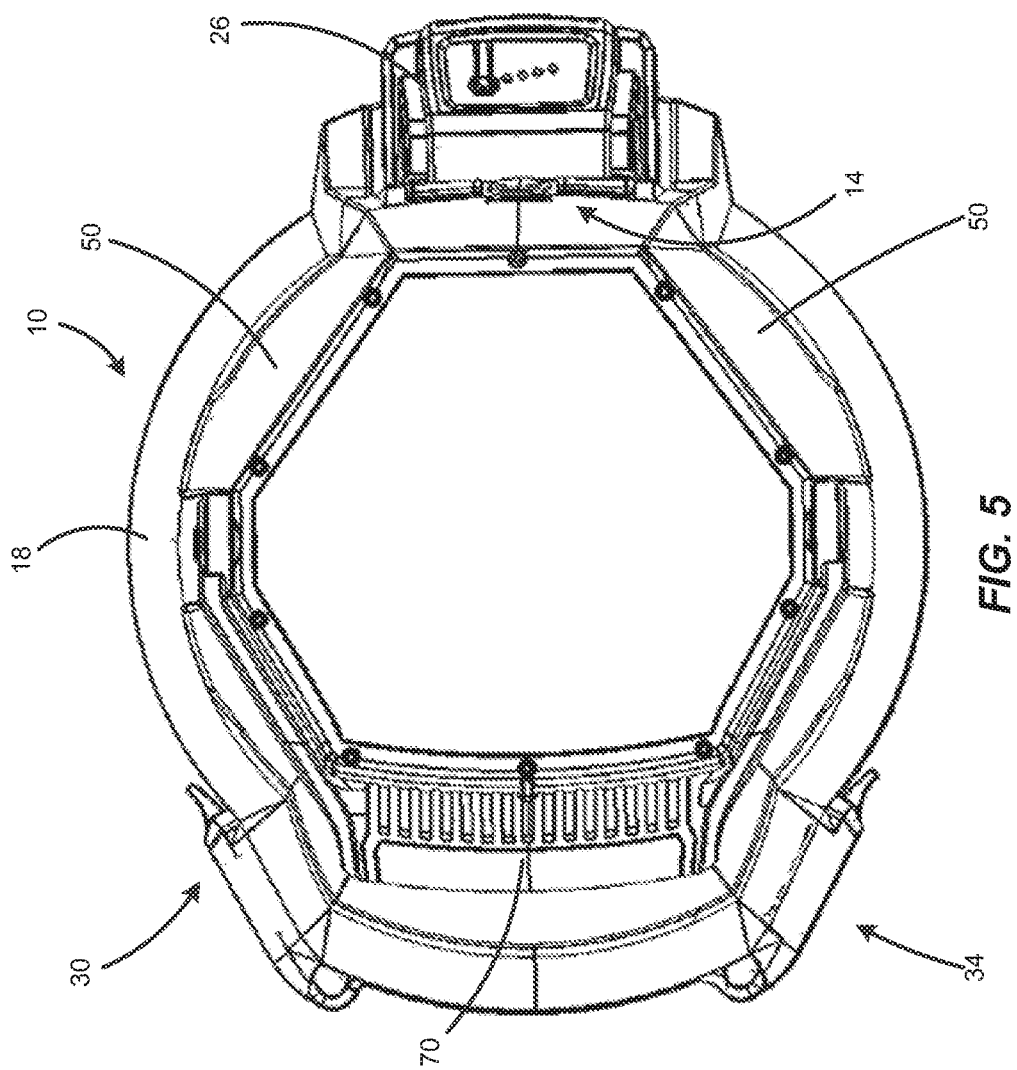
FIG. 5 is a top view of the area light.

With reference to FIG. 5, the area light 10 includes a pivotable handle 70 having a portion configured to be grasped by a user. Alternatively, the handle 70 may also be configured to be hung on a support member within a workspace (e.g., a hook, a rod, etc.) to hang the light above the ground. The handle 70 is shown in a stowed position and is pivotable to a carrying position in which a user can carry the light 10 or hang the light 10 on a support member.

Figure 6:
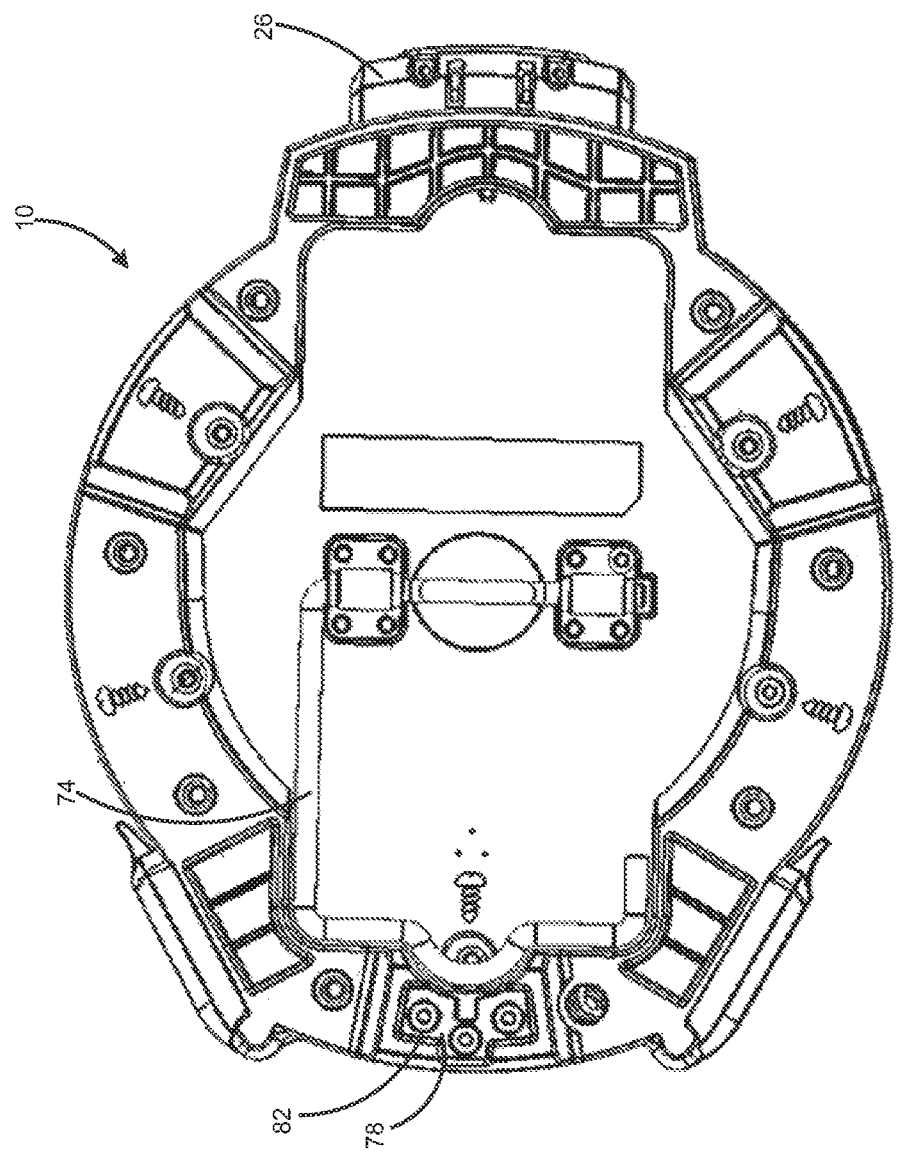
FIG. 6 is a bottom view of the area light.

With reference to FIG. 6, the area light 10 includes a pivotable hook 74 and a reinforced support plate 78 within a slot 82. The pivotable hook 74 defines an open end 76 such that the hook 74 may be pivoted relative to the light 10 in order to facilitate the hanging of the light 10 on a support member within the work space. The slot 82 is configured to receive a support member, such as a fastener head or hook, with the support member abutting the support plate 78. In this manner, the light 10 may be hung within on the support member within the work space.

In operation, the handle 70, the pivotable hook 74, and the slot 82 allow a user to couple the area light 10 to a support member in the work space. Using the user interface 14, the user may energize the light assembly 46 using the first control member 54 and adjust other light assembly characteristics using the second and third control members 58, 62. For example, the user may operate the light assembly at a desired intensity while also energizing only a portion of the light.

The light may also include a power control circuit that allows the light to select the power source from which, or to which power is delivered. For example, the power control circuit could be arranged to deliver power to the LEDs from the external power source when that power source is available and to automatically switch to or select the battery as the source when the external source is not available. In addition, the battery could be charged by the external power source while the external power source delivers power to the LEDs.

Figure 7:
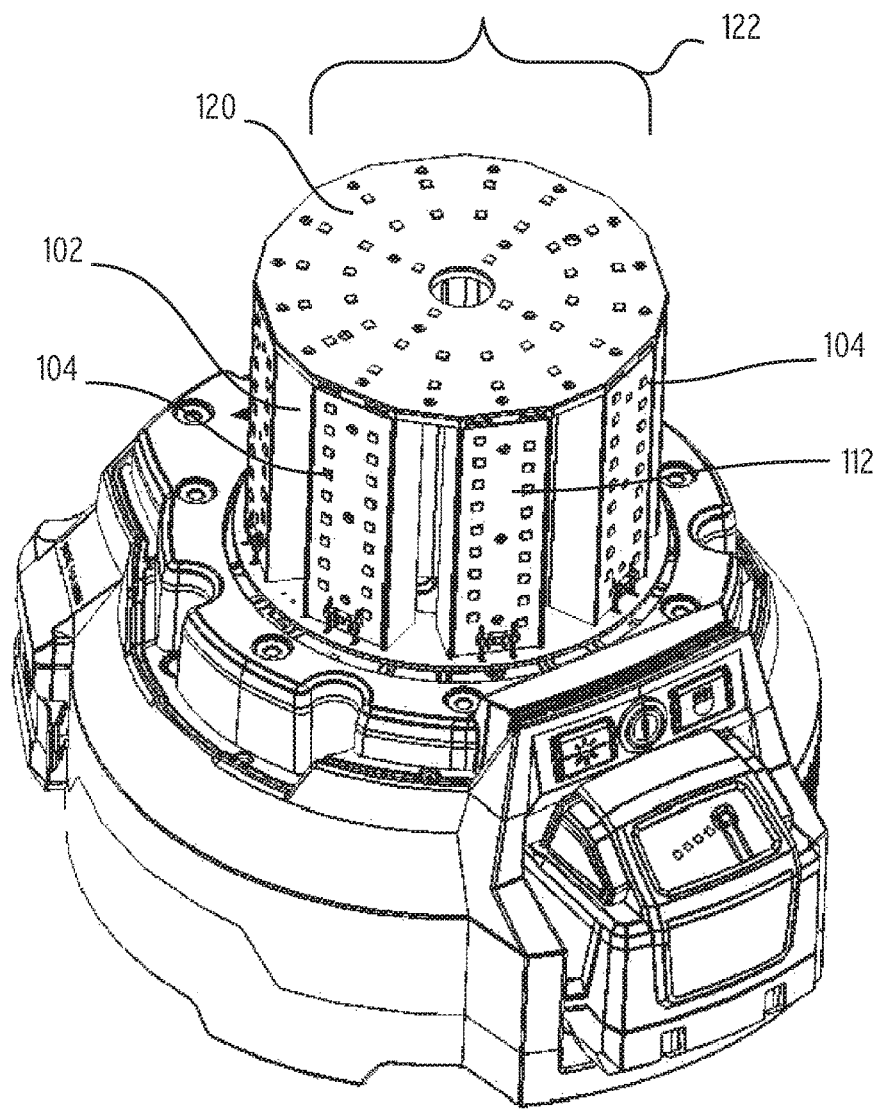
FIG. 7 is a perspective view of the area light of FIG. 1 with the lens removed.
Figure 8:
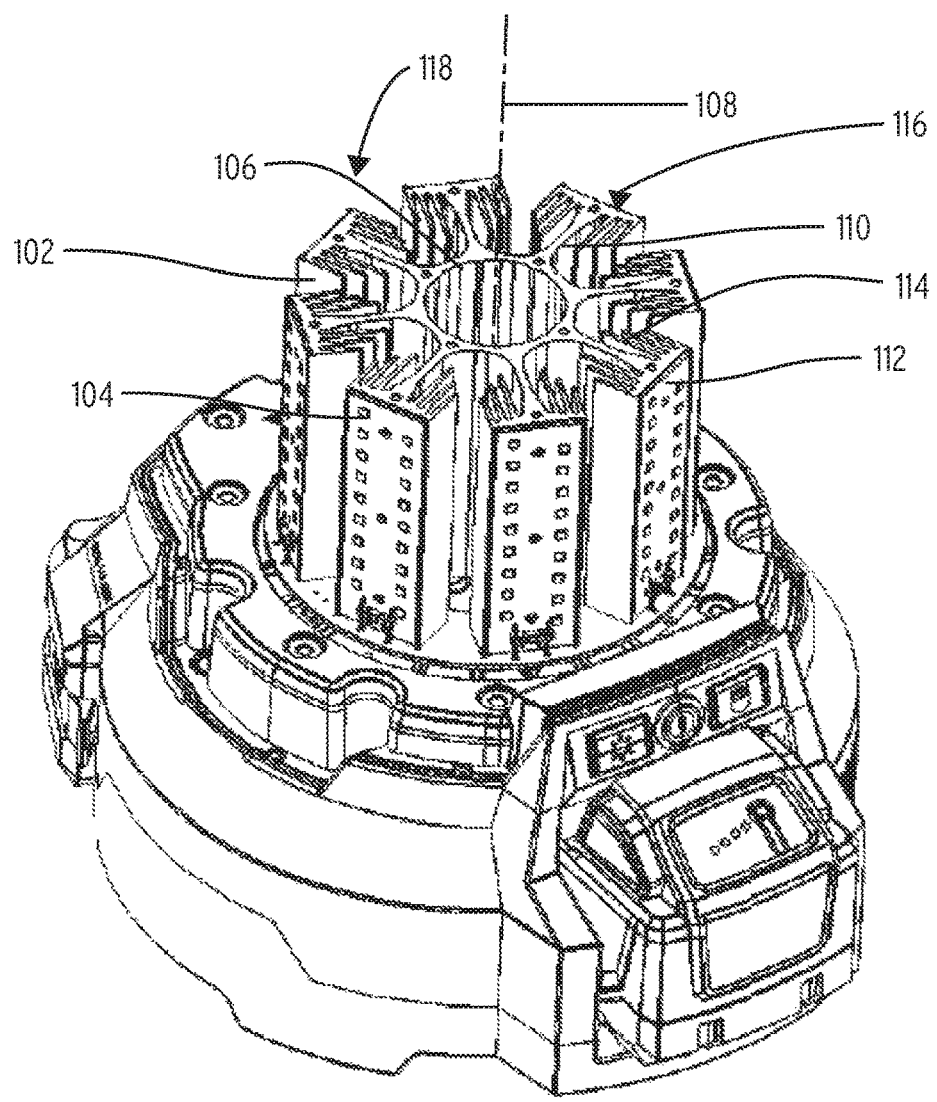
FIG. 8 is a perspective view of the area light of FIG. 7 with a portion of the light assembly and the lens removed.

FIGS. 7 and 8 show the area light of FIGS. 1-6 with the lens 50 removed to better illustrate features of the light assembly 46. With reference to FIG. 8, the light assembly 46 includes a heat sink 102 that supports a quantity of LEDs 104. The heat sink 102 includes a central tube portion 106 that extends along a central axis 108 and eight arms 110 extending radially outward from the central tube 106. Each of the arms 110 includes an outward facing surface 112 on which a number of LEDs 104 are attached. A number of fins 114 extend inward toward the central tube 106 from the outward facing surface 112 to enhance the cooling ability of the heat sink 102. Each of the arms 110 (or groups of arms 110) defines a sector 116, with the sectors 116 extending 360 degrees around the central axis 108 or the central tube 106. The user interface 14, first control member 54, second control member 58, third control member 62, or control unit are operable to activate the LEDs 104 on a per sector basis. Thus, in use, a user could activate the LEDs 104 on a single sector 116 or multiple sectors 116 as may be desired. In one construction, two adjacent arms 110 define a sector 118 such that the user can activate the light to illuminate a 90 degree wedge, a 180 degree wedge, a 270 degree wedge, or the entire 360 degree area around the light 10. The control unit is capable of storing the on/off configuration of the various sectors 116, 118 when the light 10 is turned off to allow the same sector on/off configuration when the light 10 is reactivated.

As illustrated in FIG. 7, a plate 120 is positioned on top of the heat sink 102 and includes a number of LEDs 104 arranged to direct light in a direction parallel to the central axis 108. The plate 120 and LEDs 104 define a planar sector 122 that can be controlled as a separate sector 122 as discussed with regard to FIG. 8 or can be grouped with another sector 116, 118 of the light 10.

Although the invention has been described in detail with reference to certain preferred embodiments, variations and modifications exist within the scope and spirit of one or more independent aspects of the invention as described.

What is claimed is:

1. An area light comprising:
   a housing defining a central axis and having a first end and a second end that is opposite the first end;
   a lens coupled to the first end of the housing;
   a light assembly disposed within the lens, the light assembly including a plurality of arms extending radially outward from the central axis, each of the plurality of arms including a plurality of LEDs arranged to emit light through the lens and in a direction that extends 360 degrees around the central axis; and
   a battery selectively coupled to the housing and arranged to provide power to the LEDs to allow for the emission of light at a level of at least 5700 lumens for at least two hours.

2. The area light of claim 1, wherein the light assembly includes a heat sink having a central tube that extends along the central axis, and wherein each of the plurality of arms extends radially outward from the central tube.

3. The area light of claim 1, wherein the LEDs are selected to emit light in a temperature range between 3700 and 4300 Kelvin.

4. The area light of claim 3, wherein the LEDs are selected to emit light with a color rendering index between 50 and 100.

5. The area light of claim 1, wherein each of the plurality of arms includes an outward facing surface on which the plurality of LEDs are arranged.

6. The area light of claim 5, wherein each of the plurality of arms includes a plurality of fins extending from the outward facing surface toward the central axis.

7. The area light of claim 1, further comprising a pivotable hook arranged on the second end of the housing, the pivotable hook configured to pivot with respect to the second end of the housing.

8. The area light of claim 1, wherein the light assembly includes a plurality of sectors that extend 360 degrees around the central axis, and wherein each of the plurality of sectors is defined by one or more of the plurality of arms, and wherein each of the plurality of sectors is configured to emit light in a direction substantially normal to the central axis.

9. The area light of claim 8, further comprising a control unit operable to control the distribution of electrical power to the plurality of LEDs, the control unit operable to selectively direct power to all of the plurality of sectors or to a subset of the plurality of sectors.

10. The area light of claim 9, wherein the control unit includes a memory portion that stores the on/off condition of the plurality of sectors.

11. An area light comprising:
    a housing defining a central axis and having a first end and a second end that is opposite the first end;
    a lens coupled to a first end of the housing;
    a light assembly including a plurality of arms extending radially outward from the central axis, each of the plurality of arms including a plurality of LEDs arranged to emit light through the lens and in a direction that extends 360 degrees around the central axis;
    a control unit operable to control the distribution of electrical power to the plurality of LEDs; and
    a pivotable hook coupled to the second end of the housing, the pivotable hook configured to pivot with respect to the second end of the housing.

12. The area light of claim 11, wherein the light assembly includes a heat sink having a central tube that extends along the central axis.

13. The area light of claim 11, wherein the LEDs are selected to emit light in a temperature range between 3700 and 4300 Kelvin.

14. The area light of claim 13, wherein the LEDs are selected to emit light with a color rendering index between 50 and 100.

15. The area light of claim 11, further comprising a battery selectively coupled to the housing and arranged to provide power to the LEDs to allow for the emission of light at a level of at least 5700 lumens for at least two hours.

16. The area light of claim 15, wherein the battery is a power tool battery pack that is removable from the housing without disassembly of the housing.

17. The area light of claim 11, further comprising a power inlet arranged to selectively receive electrical power from an AC source of power.

18. The area light of claim 11, wherein the lens surrounds the light assembly and a range between 3500 and 5500 lumens passes through the lens.

19. The area light of claim 18, wherein the control unit includes a memory portion that stores the on/off condition of the plurality of sectors.

20. An area light comprising:
    a housing defining a central axis and having a first end and a second end that is opposite the first end;
    a light assembly including a plurality of arms extending radially outward from the central axis, each of the plurality of arms including a plurality of LEDs;
    a plurality of sectors that extend 360 degrees around the central axis, each of the plurality of sectors defined by one or more of the plurality of arms and arranged to emit light in a direction substantially normal to the central axis;
    a planar sector arranged normal to the central axis and including a plurality of top LEDs arranged to emit light in a direction substantially parallel to the central axis;
    a lens coupled to the first end of the housing and covering the light assembly and the planar sector;

a port formed as part of the housing and sized to selectively receive a battery;
a power inlet arranged to selectively receive electrical power from an AC source of power;
a control unit operable to control the distribution of electrical power from one of the port and the power inlet to the plurality of LEDs, the control unit operable to selectively direct power to all of the plurality of sectors or to a subset of the plurality of sectors; and
a pivotable hook coupled to the second end of the housing, the pivotable hook configured to pivot with respect to the second end of the housing.

\* \* \* \* \*